Sept. 28, 1954  A. A. GAYLE ET AL  2,690,354
SAFETY DEVICE FOR VEHICLES
Filed May 21, 1952  2 Sheets-Sheet 1
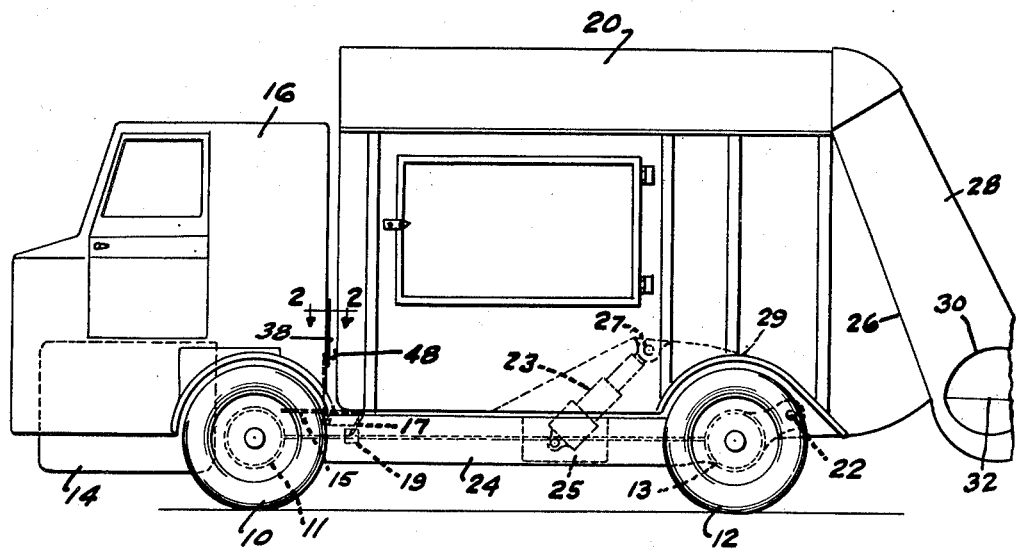
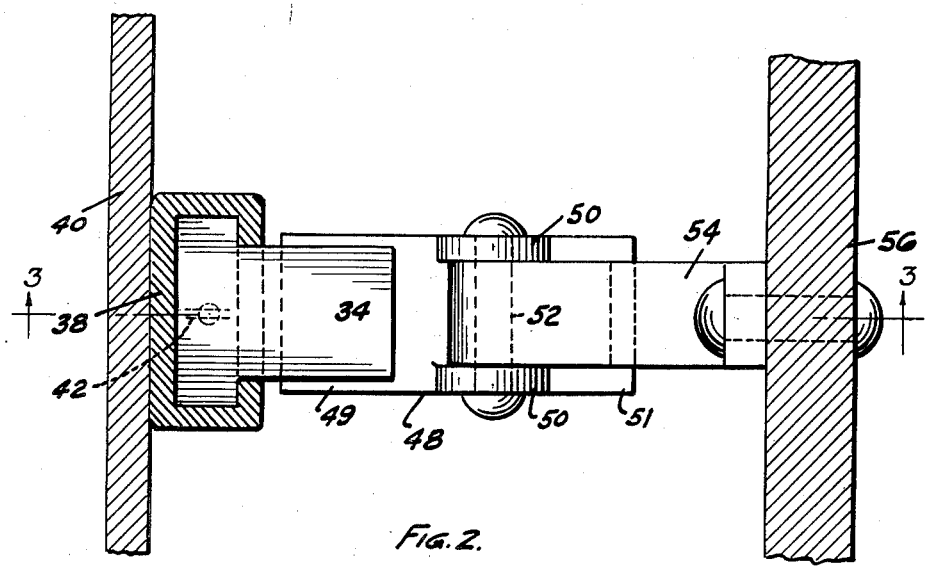
INVENTORS.
AUBREY A. GAYLE
HARRY J. KELLY
BY Harry H. Hitzeman
ATTORNEY.

Sept. 28, 1954
A. A. GAYLE ET AL
2,690,354
SAFETY DEVICE FOR VEHICLES
Filed May 21, 1952
2 Sheets-Sheet 2
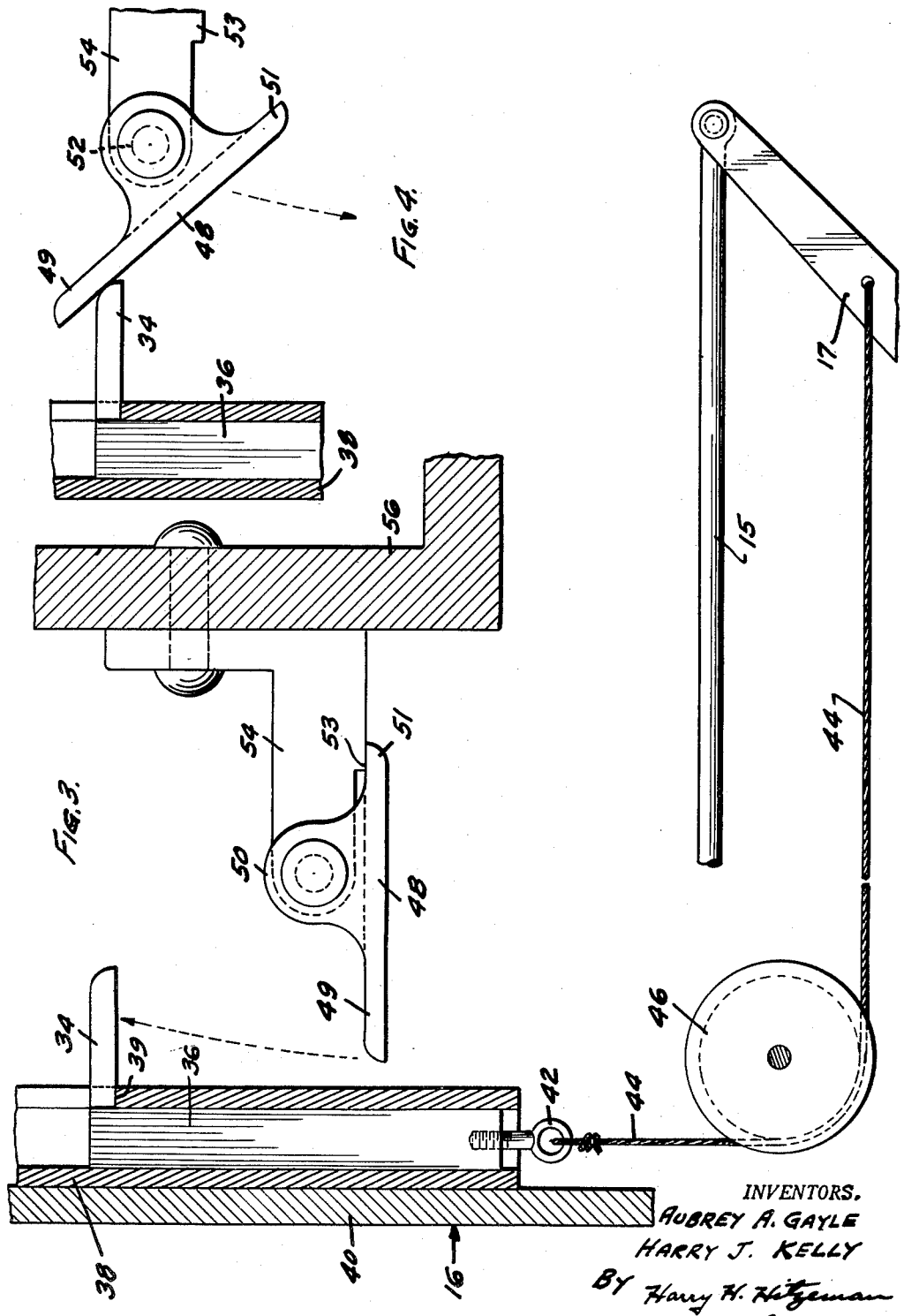
INVENTORS.
AUBREY A. GAYLE
HARRY J. KELLY
By Harry H. Hitzeman
ATTORNEY Patented Sept. 28, 1954

2,690,354

UNITED STATES PATENT OFFICE 2,690,354

SAFETY DEVICE FOR VEHICLES

Aubrey A. Gayle and Harry J. Kelly, Chicago, Ill.

Application May 21, 1952, Serial No. 289,054

8 Claims. (Cl. 298—17)

Our invention relates to improvements in safety devices for vehicles.

Our invention relates more particularly to safety devices for vehicles having dump bodies.

One of the disadvantages of the present dump truck body construction resides in the fact that no practical or efficient means is provided for preventing accidental raising of the pivoted dump body while the truck is being driven. Since this may happen without the knowledge of the driver, he may drive under a bridge or viaduct and damage or wreck the dump body as well as cause damage to the truck and the viaduct or bridge.

The principal object of the present invention is to provide a safety latch or locking mechanism by which the brakes of the truck will be automatically applied when the dump body starts raising.

A further object of the invention is to provide such a mechanism which operates the air brake valve of the truck when the dump body accidentally raises so that the truck comes to a stop at once, thereby giving warning to the driver that the dump body is raising.

A further object of the invention is to provide a mechanism of the type described capable of acting to apply the truck brakes when the dump body raises, but also capable of automatic resetting for the next operation by the lowering of the truck body to its normal position on the truck.

A further object of the invention is to provide a mechanism of the type described that is easily made and installed, yet capable of long and hard usage without becoming broken or out of order.

Other objects and advantages will be more apparent from the following description wherein reference is had to the accompanying drawings, upon which:

Fig. 1 is a side elevational view of one type of truck having a pivotally mounted dump body thereon, parts thereof being shown in a general diagrammatic manner;

Fig. 2 is a plan sectional view taken on line 2—2 of Fig 1;

Fig. 3 is a cross-sectional view taken on line 3—3 of Fig. 2; and

Fig. 4 is a changed position view of the trip member descending for an automatic resetting of the same.

In the embodiment of the invention which we have chosen to illustrate and describe the same, in Fig. 1 we have shown a typical dump truck assembly which may include the front and back sets of wheels 10 and 12 and a motor 14 for driving the same mounted below a cab 16 located at the forward end of the vehicle. The vehicle may be provided with the air brakes 11 and 13 on both the front and back wheels, the brakes being controlled in the usual manner by a foot lever in the cab (not shown) connected to a brake valve operating lever 15 that connects to a lever 17 on the air brake valve 19 to apply the brakes or to release the same.

The dump truck body 20 is provided with the usual mechanism for pivotally raising the forward end of the same about a pair of pivots 22 adjacent the back end of the truck frame 24 so that the contents thereof may be dumped out of the open back end 26 when desired. This mechanism, as is well known in the art, includes a telescoping hydraulic piston assembly 23 mounted on a base 25 on the truck frame 24, the upper end being pivotally connected at 27 to the floor 29 of the dump truck body 20.

As previously pointed out, dump truck bodies of this type can accidentally start to swing up while the vehicle is being driven, thus causing damage to the dump truck body or to bridges or viaducts in the event the truck driver tries to pass through or below the same. In order to prevent the dump truck body from accidentally rising, we have provided a mechanism which may include a latch arm 34 having a rectangularly shaped body portion 36 which is slidably mounted in a channel shaped guide member 38 that is fastened in a vertical position to the back wall 40 of the cab 16. The lower end of the body 36 may be connected by a screw member 42 to a flexible wire 44 that is trained about a pulley 46 mounted adjacent the lower end of the cab. The flexible wire 44 may be connected at its other end to the air brake operating lever 17 below the connection of the foot brake lever 15.

We provide a trip member 48 which has a pair of ear members 50 extending upwardly therefrom to receive a rivet or bolt member 52 fastened in the end of a bracket 54. The bracket 54 may be riveted or otherwise firmly secured to the front wall 56 of the dump truck body 20.

When the vehicle is being propelled down the street and for any reason the dump truck body 20 starts to rise about its pivot 22, the trip member 48 will rise with the front end of the dump truck body until the end 49 of the same reaches the latch arm 34 of the latch 36. Continued rising of the same will raise the latch 36, and through the flexible wire 44 operate the air brake valve 19 to apply the brake to the vehicle, thus stopping the same. When the trip lever 48 has raised the latch arm 34 until it passes the same, the latch 36 will drop by gravity to the position shown in Fig. 3, the latch arm 34 coming to rest on the shoulder 39 of the guide 38. Mechanism not shown may now be applied to raise the dump truck body for a dumping operation if desired, or it may be operated to lower the forward end of the dump truck body. As the forward end of the dump truck body descends, the pivotally mounted trip member 48 will tilt, as shown in Fig. 4, until it passes the latch arm 34, and swing into the operative position shown in Fig. 3 with the end 51 of the trip member resting against the shoulder 53 on the bracket 54.

From the above and foregoing description it can be seen that we have provided a completely automatic safety control member for preventing the unauthorized or accidental raising of the dump truck body. The operation of the latch is solely for the purpose of applying the air brakes as the trip member raises the latch arm, and after they have been applied automatically in this manner, the brakes may be manually released and the dump truck body may be raised or lowered as desired by the operator. Whenever the dump truck body is lowered to the normal position, the trip member and latch arm will be automatically reset for the next operation of the same.

While we have illustrated and described a specific embodiment of the invention, it will be apparent to those skilled in the art that changes and modifications may be made in the exact details shown, and we do not wish to be limited in any particular; rather what we desire to secure and protect by Letters Patent of the United States is:

1. The combination with an automatic vehicle having a frame with a pivoted dump truck body thereon, a motor, wheels for supporting said frame, said wheels driven by said motor, air brakes for said wheels and an air brake valve, of automatic means for operating said valve to apply said brakes whenever the end of said dump truck body starts rising.

2. The combination with an automatic vehicle having a frame with a pivoted dump truck body thereon, a motor, wheels for supporting said frame, said wheels driven by said motor, air brakes for said wheels and an air brake valve, of automatic means for operating said valve to apply said brakes whenever the end of said dump truck body starts rising, said automatic means including a latch arm associated with said valve and a trip member fastened to said dump truck body.

3. The combination with an automatic vehicle having a frame with a pivoted dump truck body thereon, a motor, wheels for supporting said frame, said wheels driven by said motor, air brakes for said wheels and an air brake valve, of means for operating said valve to apply said brakes whenever the end of said dump truck body starts rising, said means including a latch arm associated with said valve and a trip member fastened to said dump truck body, said latch arm slidably mounted on the cab of said vehicle and adapted to be moved by engagement with said trip member.

4. The combination with an automatic vehicle having a frame with a pivoted dump truck body thereon, a motor, wheels for supporting said frame, said wheels driven by said motor, air brakes for said wheels and an air brake valve, of means for operating said valve to apply said brakes whenever the end of said dump truck body starts rising, said means including a latch arm associated with said valve and a trip member fastened to said dump truck body, said latch arm slidably mounted on the cab of said vehicle and adapted to be moved by engagement with said trip member, said trip member being pivotally mounted and capable of resetting after each use.

5. The combination with an automatic vehicle having a cab, a frame with a pivoted dump truck body thereon, a motor, wheels for supporting said frame, said wheels driven by said motor, air brakes for said wheels and an air brake valve, of means for operating said valve whenever the end of said dump truck body starts rising, said means including an operating lever on said valve, a slotted guide fastened to said cab, a latch member slidably mounted in said guide, said latch member operatively connected to said lever and a trip member connected to the dump truck body adapted to engage said latch member to raise the same during upward movement of said dump truck body.

6. The combination with an automatic vehicle having a cab, a frame with a pivoted dump truck body thereon, a motor, wheels for supporting said frame, said wheels driven by said motor, air brakes for said wheels and an air brake valve, of means for operating said valve whenever the end of said dump truck body starts rising, said means including an operating lever on said valve, a slotted guide fastened to said cab, a latch member slidably mounted in said guide, said latch member operatively connected to said lever and a trip member connected to the dump truck body adapted to engage said latch member to raise the same during upward movement of said dump truck body, said trip member pivotally mounted and capable of resetting each time the dump truck body is lowered.

7. Mechanism for automatically applying the air brakes of a vehicle having a dump truck body thereon whenever the dump truck body starts rising, which comprises a vertically disposed guide member, a latch slidably mounted therein, said latch having a forwardly extending arm, a bracket on said dump truck body, a trip member supported by said bracket, said trip member adapted when said dump truck body is raised to engage said latch arm to raise the same, said latch arm connected to the air brake valve of said vehicle to apply the brakes thereon.

8. Mechanism for automatically applying the air brakes of a vehicle having a dump truck body thereon whenever the dump truck body starts rising, which comprises a vertically disposed guide member, a latch slidably mounted therein, said latch having a forwardly extending arm, a bracket on said dump truck body, a trip member supported by said bracket, said trip member adapted when said dump truck body is raised to engage said latch arm to raise the same, said latch arm connected to the air brake valve of said vehicle to apply the brakes thereon, said trip member pivotally mounted and adapted to be reset when said dump truck body is lowered.

References Cited in the file of this patent

UNITED STATES PATENTS

| Number | Name | Date |
| --- | --- | --- |
| 757,293 | Gantz | Apr. 12, 1904 |
| 2,350,141 | Wood | May 30, 1944 |
| 2,530,574 | Getman | Nov. 21, 1950 |